United States Patent [19]

Wyllie

[11] Patent Number: 4,913,000

[45] Date of Patent: Apr. 3, 1990

[54] THREE AND FOUR DEGREE OF FREEDOM HAND CONTROLLERS

[75] Inventor: Charles E. Wyllie, Largo, Fla.

[73] Assignee: Honeywell Inc., Minneapolis, Minn.

[21] Appl. No.: 181,062

[22] Filed: Apr. 13, 1988

[51] Int. Cl.⁴ .......................... G05G 1/00; G05G 1/04; B64C 13/04

[52] U.S. Cl. ............................... 74/523; 74/491; 244/237; 416/114

[58] Field of Search ............... 74/523, 515 E, 491; 244/236, 237; 180/315, 316, 333, 334; 416/114

[56] References Cited

U.S. PATENT DOCUMENTS

| | | | |
|---|---|---|---|
| 2,523,262 | 9/1950 | Amtmann | 244/237 X |
| 3,011,739 | 12/1961 | Boyce et al. | 244/237 |
| 3,028,126 | 4/1962 | Holleman | 244/236 |
| 4,040,499 | 8/1977 | Kestian et al. | 180/333 X |
| 4,217,569 | 8/1980 | Nejedly et al. | 244/236 X |
| 4,420,808 | 12/1983 | Diamond et al. | 364/434 |
| 4,477,043 | 10/1984 | Repperger | 244/223 |
| 4,491,325 | 1/1985 | Bersheim | 74/523 X |

Primary Examiner—Leslie A. Braun
Assistant Examiner—Janice E. Chartoff
Attorney, Agent, or Firm—Kinney & Lange

[57] ABSTRACT

A three or four degree of freedom device which includes a two or three degree of freedom wrist action hand controller and in which the additional degree of freedom control is provided by motion of an operator's forearm connected to a mounting member that carries or supports the wrist action hand controller.

20 Claims, 1 Drawing Sheet

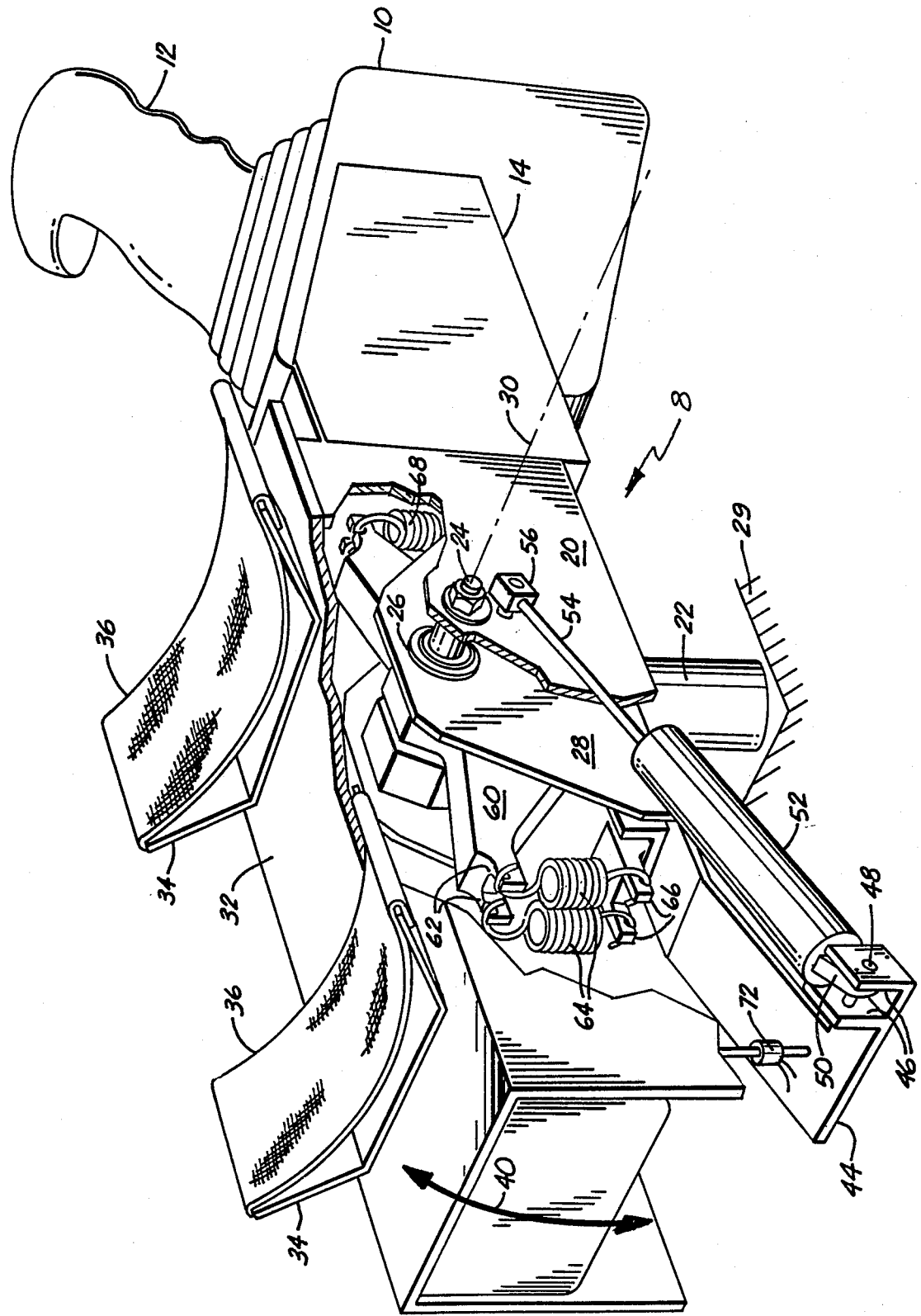

THREE AND FOUR DEGREE OF FREEDOM HAND CONTROLLERS

BACKGROUND OF THE INVENTION

1. Field of the Invention

The present invention relates to hand controllers and, more particularly, to hand operated controllers for operating remote systems such as the flight control systems in aircraft or spacecraft, or for control of robotics or land vehicle mechanisms.

2. Description of the Prior Art

Two and three degree of freedom hand command control systems are well known in the art. Such control systems have commonly been devised utilizing a control knob or handle, often shaped to fit the operator's hand, so that he can move it, for example in a three degree of freedom system, forwardly and backwardly to control the pitch of an aircraft, to the right and left to control the roll of the craft, and to twist it about a vertical axis to control the yaw of the aircraft. In some applications, as for example in helicopter control, a fourth command axis is needed to control the up and down motion, i.e. the collective motion of the craft. The collective control has heretofore been accomplished either by use of a separate dedicated controller or by adding a fourth axis to a three axis (roll, pitch, yaw) hand controller so that the operator lifts the control knob or handle vertically or pushes it downwardly to produce the desired collective control.

The various hand motions required have sometimes produced cross-coupling problems, i.e. where the operator in moving his wrist to produce one control accidentally also produces another control. Of all of the control motions that heretofore have existed in hand controllers, it is the fourth degree of freedom which produces the most cross-coupling difficulty for the operator. It is believed that while the operator can normally separate his operations to control roll, pitch and yaw by motions of the wrist, the adding of the fourth degree of freedom intermixes with the other motions to make it more difficult for the operator to accomplish. Furthermore, the up and down motion for the fourth degree of freedom produces muscle stress in the forearm of the operator.

SUMMARY OF THE INVENTION

The present invention removes the fourth degree of freedom from the wrist motion of the operator and transfers it to an arm motion. More particularly, the usual two or three degree of freedom hand controller of the prior art is mounted on a movable member which may be controlled by the operator's forearm. The operator controls these three degrees of freedom by motions of his wrist in the same manner as is heretofore used in three axis controllers. The fourth axis, however, is now transferred to a motion of the forearm, for example, a pivoting motion of the forearm in or near a vertical plane about a horizontal axis so as to control the collective motion of the craft as desired. As the operator moves his forearm about the fourth axis, the two or three axis hand controller travels with the motion and no additional wrist motion of the operator is produced. Conversely, three axis hand-wrist command motions can be accomplished without effecting the forearm controlled fourth axis. Consequently, four axes (degrees of freedom) can be independently controlled without cross-coupling.

BRIEF DESCRIPTION OF THE DRAWINGS

FIG. 1 shows a perspective and partially cut away view of the four degree of freedom hand controller of the present invention.

DETAILED DESCRIPTION OF THE PREFERRED EMBODIMENTS

In FIG. 1, a control station 8 is shown to include a three degree of freedom rotational hand controller 10, having a hand grip 12, and is shown mounted to a support bracket 14 which is fixedly attached to an arm support 20. Controller 10 may be any suitable two or three axis controller of the prior art, as for example the Honeywell three degree of freedom hand controller used on the space shuttle Orbiter, and need not be further described herein.

To provide a fourth axis control as, for example, the collective control for a helicopter to cause it to move up and down, the present invention utilizes a forearm controller to provide an additional uncoupled command motion independent of the hand-wrist controller position. To accomplish this, arm support 20, which carries the three axis controller 10 with it, is rotatably mounted with respect to a support pedestal 22 by a bolt 24 pivotally mounted in a bearing 26 attached to a fixed member 28 connected to pedestal 22. Pedestal 22 may be part of a chair in which the operator sits or otherwise be attached to the craft as shown by hatch lines 29. By this arrangement, arm support 20 may move about an axis 30 through bearing 26 and with such motion carry with it the two or three degree of freedom hand controller 10. Support 20 has an upper surface 32 upon which a pair of brackets 34 are mounted, each of which carries a support strap 36. The operator's forearm is cradled or constrained in position by formed supports 36 and 34 so that his forearm motion, as for example in a direction shown by arrow 40, will produce rotary motion of support member 20 with respect to fixed member 28 about axis 30. Axis 30 is seen to be generally perpendicular to the operator's forearm centerline although spaced therebelow. Axis 30 will be easily arranged to provide optimum spacing above, at or below the operator's forearm dependent on each system application.

Member 28 has a rearwardly and slightly downwardly extending flange 44 which carries a pair of upward extensions 46 through which a pin 48 is inserted to hold an end 50 of a damper member 52. Damper 52 includes a rod 54 which is mounted to arm support 20 by a pivotal device 56. Damper 52 provides damping for the relative motion between support member 20 and fixed member 28.

A biasing member 60, which is driven by support arm 20, has a pair of extensions 62 which carry a pair of tension springs 64, the other ends of which are connected to a pair of extensions 66 fixedly attached to member 28. Similar springs 68, only partially visible in the figure, are connected between the other end of bias member 60 and fixed member 28. The purpose of springs 64 and 68 is to provide tension on the arm support 20, to give the operator proprioceptive force feedback for motions about axis 30, and to provide a centering force for support 20 with respect to fixed member 28. The commanded motion of support 20 with respect to member 28 can be detected in any number of ways as, for example, a linear variable differential transformer 72, one end of which is connected to the left end of support member 20 and the other end of which is attached to the flange 44 of member 28. Of course, other types of pick-offs may be employed such as potentiometers or rotary variable differential transformers. The output of transformer 72 supplies the command signal for use in control of a function in this axis.

It is therefore seen that I have provided a three or four degree of freedom hand controller in which the extra degree of freedom is provided by a forearm motion of the operator without disturbing the operation of the two or three degree of freedom hand controller known in the prior art. While I have shown the arm controller pivoting about an axis 30, which in the figure is generally horizontal, and operating to produce an output from transformer 72 when the operator's forearm is tilted forward and back, the axis could easily be generally vertical in the figure in which event the motion of the operator's forearm to the right and left in a horizontal plane would produce this fourth axis output. As used herein, "horizontal" and "vertical" are relative terms generally referenced to a cockpit or control station structure, not necessarily referenced to earth. Fore and aft motion of arm support 20 would also be possible. Furthermore, while I have shown the controller as useful in controlling the collective motion of a helicopter, many other applications of the principle to control four separate variables with one hand are to be included within the scope of this invention.

Accordingly, although the present invention has been described with reference to an initial, developmental embodiment, workers skilled in the art will recognize that changes may be made in form and detail without departing from the spirit and scope of the invention.

What is claimed is:

1. Apparatus for use with a wrist motion hand controller comprising:
   stationary means;
   arm support means fixedly connected to the hand controller and mounted for movement with respect to the stationary means; and
   relative movement responsive means connected to the stationary means and to the arm support means to produce an output indicative of movement between the arm support means and the stationary means.

2. Apparatus according to claim 1 wherein the arm support means includes holding means adapted to hold an operator's forearm on the arm support means so that the operator's hand may operate the hand controller and the operator's forearm may produce the movement between the arm support means and the stationary means independently of any wrist motion of the operator.

3. Apparatus according to claim 2 wherein the wrist motion hand controller is a three degree of freedom device for producing first, second and third control signals and the output of the relative movement responsive means provides a fourth control signal.

4. Apparatus according to claim 3 wherein the apparatus is mounted in a control station and the first, second, third and fourth control signals are used to control remote systems with respect to four different axes.

5. Apparatus according to claim 4 wherein the remote systems are flight control systems and the first, second, third and fourth control signals control pitch, roll, yaw and collective motions.

6. The method of producing at least three individual control signals with motions of an operator's hand comprising the steps of:
   (A) producing first and second signals utilizing two separate motions of the operator's wrist; and
   (B) producing an additional signal utilizing a motion of the operator's forearm, the additional signal capable of being produced without affecting the first and second signals.

7. The method of claim 6 wherein four individual control signals may be produced and wherein step A is accomplished with a three degree of freedom hand controller.

8. The method of claim 6 wherein step B is accomplished with a movable member adapted to accommodate the operator's forearm.

9. The method of claim 8 wherein four individual control signals may be produced and wherein step A is accomplished with a three degree of freedom hand controller attached to the movable member.

10. The method of claim 9 wherein the fourth signal is produced in accordance with motion of the movable member.

11. A four axis controller comprising:
    a fixed support means; and
    movable means connected to the support means for first motion with respect thereto, said movable means adapted to carry a three degree of freedom wrist motion hand controller and adapted to accommodate an operator's forearm with the operator's hand operating the hand controller to provide first, second and third axis control and motion of the operator's forearm producing the first motion to provide fourth axis control.

12. Apparatus according to claim 11 wherein the first motion is rotational about an axis lying in a plane generally perpendicular to the forearm.

13. Apparatus according to claim 11 further including spring means connected to the support means and the movable means to supply force feedback for the first motion.

14. Apparatus according to claim 13 wherein the spring means also operates to provide a centering force for the movable means.

15. Apparatus according to claim 11 further including damping means connected between the support means and the movable means.

16. Apparatus according to claim 14 further including damping means connected between the support means and the movable means.

17. Apparatus according to claim 11 further including transducer means connected between the support means and the movable means to supply an output signal in accordance with the first motion.

18. Apparatus according to claim 16 further including transducer means connected between the support means and the movable means to supply a first output signal in accordance with the first motion.

19. Apparatus according to claim 18 wherein the hand controller is operable to supply second, third and fourth outputs.

20. Apparatus according to claim 19 wherein the apparatus is mounted in a vehicle and the first, second, third and fourth outputs control the vehicle with respect to four axes.

* * * * *